Nov. 27, 1956          J. MIHALYI          2,771,812
APPARATUS FOR CONTINUOUS MOTION PICTURE PROJECTION
Filed Sept. 5, 1952          4 Sheets-Sheet 1
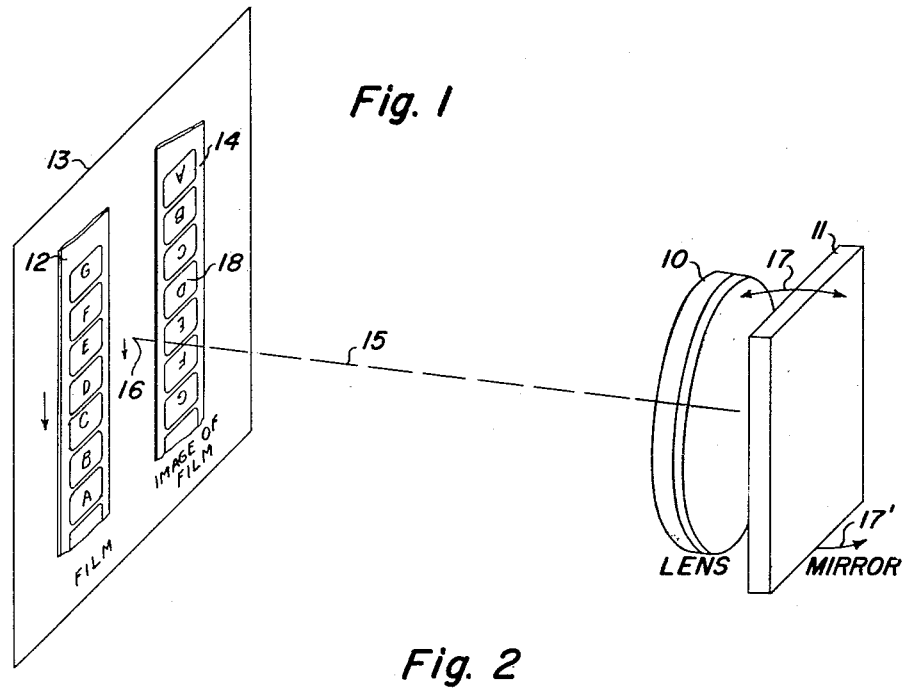
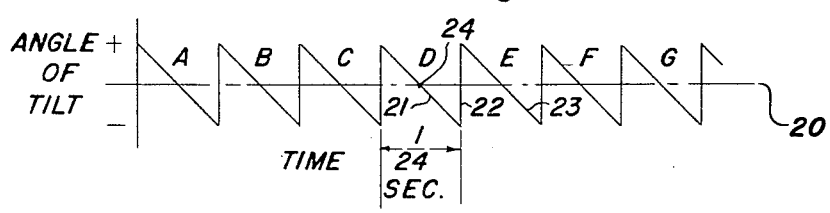
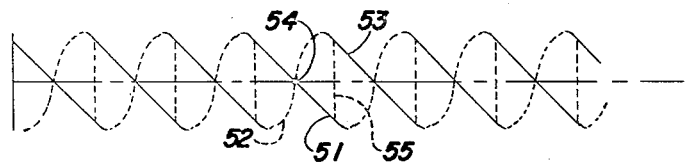
JOSEPH MIHALYI
INVENTOR.
BY
ATT'Y & AG'T Nov. 27, 1956  J. MIHALYI  2,771,812
APPARATUS FOR CONTINUOUS MOTION PICTURE PROJECTION
Filed Sept. 5, 1952  4 Sheets-Sheet 2

JOSEPH MIHALYI
INVENTOR.

BY Daniel I. Maynes,
Harold F. Bennett
ATT'Y & AG'T

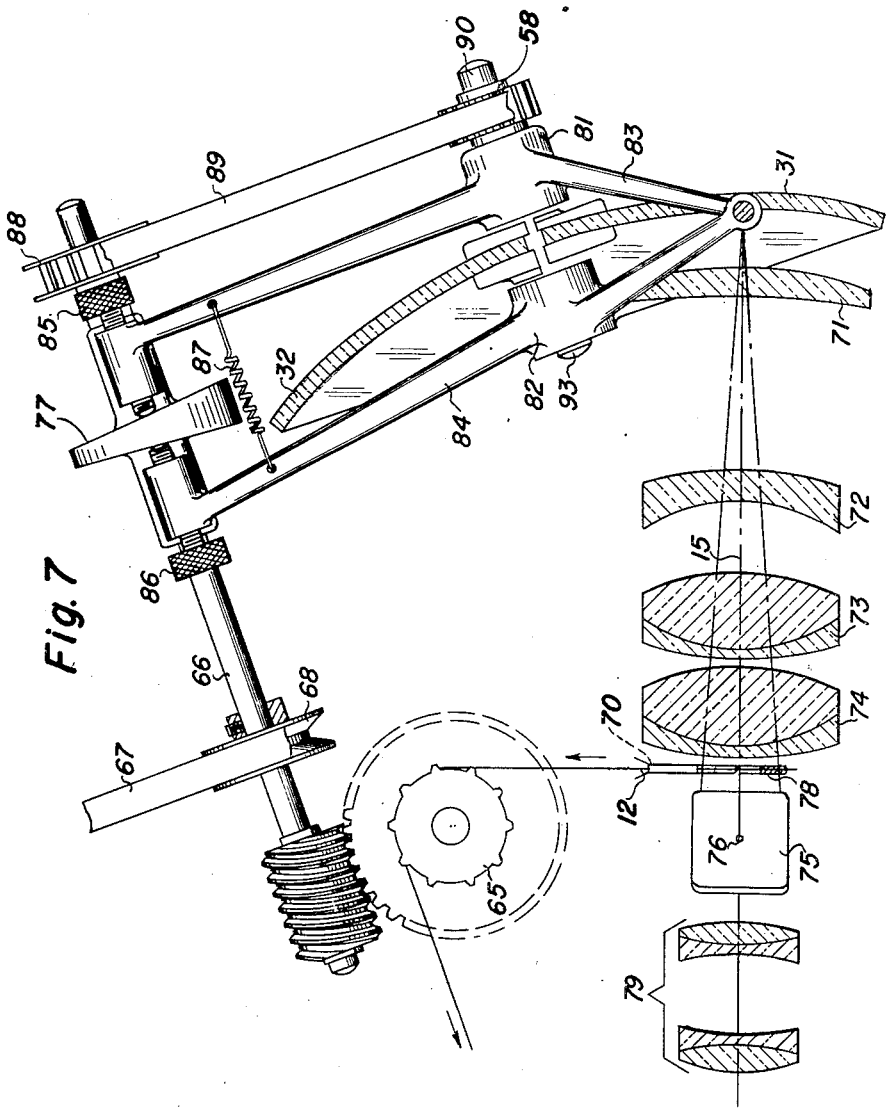

Nov. 27, 1956  J. MIHALYI  2,771,812
APPARATUS FOR CONTINUOUS MOTION PICTURE PROJECTION
Filed Sept. 5, 1952  4 Sheets-Sheet 4
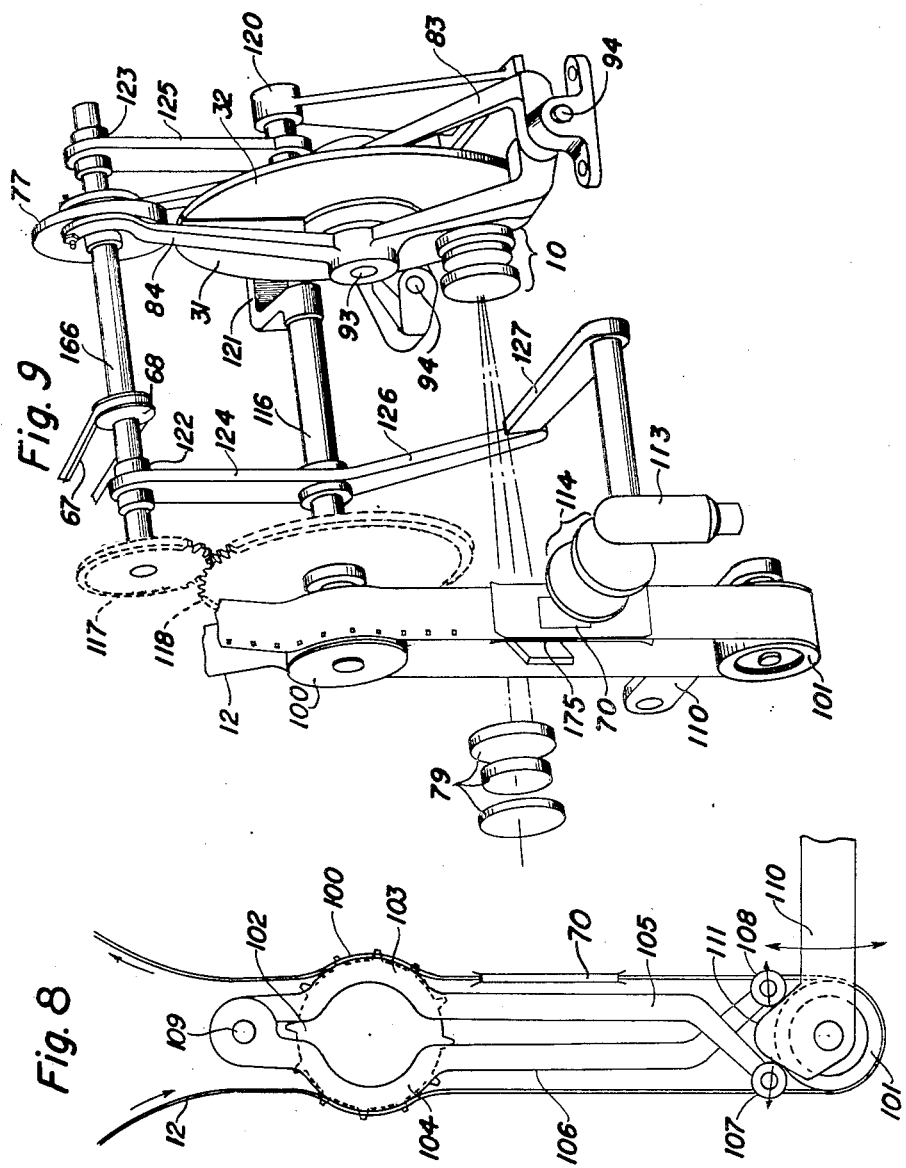
JOSEPH MIHALYI
INVENTOR.
BY
ATT'Y & AG'T United States Patent Office 2,771,812
Patented Nov. 27, 1956

2,771,812

APPARATUS FOR CONTINUOUS MOTION PICTURE PROJECTION

Joseph Mihalyi, Rochester, N. Y., assignor to Eastman Kodak Company, Rochester, N. Y., a corporation of New Jersey Application September 5, 1952, Serial No. 308,097

2 Claims. (Cl. 88—16.8)

This invention relates to continuous motion-picture projection of the type using tilting mirrors to compensate for the movement of the film.

The object of the invention is to provide a continuous motion-picture projector which is comparatively simple in construction and which is substantially free from keystoning and out-of-focus errors.

It is a further object of the invention to provide a continuous motion-picture projector in which the projected image fades from one frame into the next without a dark band passing across the field.

It is a particular object of the invention to provide a continuous motion-picture projector which is especially suitable for television broadcasting from film.

It is an ancillary object of the invention to provide a continuous motion-picture projector in which the fade-out from one frame to the next occurs without stroboscopic effects between the periodic scanning of the picture for television and the periodic change-over from one frame to the next, which would usually be visible as a dark band sweeping across the screen.

Many systems have been proposed for the projection of motion pictures in which a projected image is maintained upon a screen at all times in order to avoid the flicker due to the use of a shutter as in ordinary movie projection and also to increase the average brightness of the screen. Every system proposed, however, has had some disadvantages, either the expensive construction or low aperture of the optical system or optical errors such as keystoning and astigmatism, and no continuous motion-picture projector heretofore proposed has seriously challenged the pulldown type of projector in common use.

With the advent of television, however, a greater need arises for continuous motion-picture projection, and the performance requirements are in some respects more severe than in ordinary projection. In standard television projection the scene being televised is scanned 30 frames per second, whereas the standard rate of movie projection is 24 frames per second. Obviously, if the television broadcast is picked up from an ordinary pulldown type of projector, certain parts of the image area are being scanned while the shutter is closed for the pulldown on one out of every five scannings or six times per second, and this causes a very noticeable flicker in this part of the picture. Moreover, if the speed of the movie projector is faster or slower than standard, the area of the picture where the flicker occurs creeps across the screen due to the stroboscopic effect. Various proposals have been made for exactly synchronizing the motion-picture projector and the television camera scanning whereby every fifth frame is scanned twice. This requires complications in the pulldown mechanism, however, and furthermore, it prevents the speeding up or slowing down of the motion as is desirable sometimes for special effects and for fitting the movie into the exact broadcast time available. What is really needed is a motion-picture projector mechanism which is capable of projecting an image onto the screen at all times and in which the fade-out from one frame to another takes place without a dark boundary line sweeping across the screen and without any perceptible darkening of the screen. Even though such fade-out irregularities would not be perceptible in ordinary movie viewing, the stroboscopic effects would still appear due to the fact that the scanning spot only picks up one point in the image at any particular instant and if even a slight darkening of the screen occurred during the fade-out period, this too would be picked up as a slight darkening of one area of the image occurring six times per second.

To avoid these difficulties, it has been proposed to use continuous movie projectors in which the film travels without interruption through the film gate and the movement of the image of each frame of the film is stopped by an optical compensator. One known type of optical compensator comprises a mirror which can be tilted in synchronization with the film travel and this has several advantages over certain other systems. The operation in the case of a single frame of the movie film is simple. The frame is moved through an elongated gate and during the same interval of time a mirror is tilted at half the apparent angular rate of advance of the film as subtended at the mirror and the image of the movie frame in the mirror then stands still. It has not been found practical, however, to tilt the mirror back to its initial position when the next movie frame comes into the gate because, even if this is done in 1/500 of a second, some blurring becomes visible, and if it is done faster than that the inertia effects become so great as to prevent the accurate positioning of the mirror.

According to the present invention, a continuous motion-picture projector is provided in which the motion-picture film is fed through an elongated film gate extending over two frames of the movie film and a unit magnification catadioptic system is provided which is positioned in front of the gate and which images the gate back into its own plane and beside the gate. This optical system includes a mirror and may consist entirely of a concave mirror whose center of curvature is substantially in the place of the film gate, and means are provided for moving the mirror at a rate co-ordinated with the film movement so that the image of one frame of the movie film remains stationary and at the same time the mirror is moved laterally out of the optical system and another mirror is moved into the optical system with an initial tilt at which it picks up the next succeeding frame of the movie film and reflects it to coincide with the image that is just fading out. This second mirror then follows the path of the first mirror and the process is repeated for each frame of the film. It will be evident from the elementary rules of optics that in the simplest form of the invention, in which the optical system consists entirely of a concave mirror, the center of curvature of the mirror must be at the plane of the film gate and the mirror must be so moved that its center of curvature moves in the same direction as the film and at one-half the linear speed thereof. On the other hand, when there are lenses between the film gate and the mirror, these lenses form an image of the film gate which is preferably but not necessarily virtual when viewed from the position of the mirror. In general, this virtual image will be positioned in a different plane from the film gate itself and the apparent linear rate of motion of the film will be different due to the magnification of the lenses and in a special case may be at an infinite distance. In this case, the center of curvature of the mirror is not in the plane of the film gate itself but in the plane of the virtual image thereof as formed by the lenses and as viewed from the mirror position. Likewise, the rate of movement of the center of curvature of the mirror in this virtual plane must be one-half the apparent rate of movement of the virtual film image. In the special case of a virtual image at infinity, the mirror of course is plane (the plane being considered as the limiting form of the sphere with infinite radius of curvature) and the movement or tilting thereof relative to the apparent movement of the film must be computed on an angular rather than a linear basis in accordance with principles that are well known in optics.

The image formed by the reflecting system is relayed to the projection screen by any known form of projection lens and at any desired magnification in known manner. In some forms of the invention, a diagonal mirror is provided to throw the projected image at substantially a right angle to the direction in which the reflecting system throws the first image.

According to a preferred feature of the invention, a mirror disk which may be plane or concave or even convex, is made up of two halves which are independently mounted for rotation and tilting. Means are provided for rotating the mirror disk substantially in synchronism with the film advance at one revolution for each two frames of the movie film passing through the gate. The disk is mounted with the axes of the two halves roughly parallel to the optical beam which is reflected back upon itself and for definiteness the beam will be assumed to strike the disk below center. Each mirror is mounted on a shaft which rotates in a bearing of a type which determines the alignment of the shaft and the bearing as a whole is mounted on a lever which is pivoted at the axis about which the mirrors themselves are to be tilted. This axis is substantially a chord of the mirror disk crossing the optical beam at its center. One end of each of the levers upon which the two mirror halves are mounted is forked to clear the mirror and is pivoted at this axis. The other end extends beyond the mirrors in the opposite direction and is spring-urged against its respective face of a double-faced cam which rotates in exact unison with the film advance and which is cut to give the above-described reciprocating tilting motion of the mirrors. The double faced cam is thickest at one edge and thinnest near the opposite edge and as it rotates the two levers spread apart and come together again in a sort of breathing motion during each revolution. Gear means are provided for driving the cam and the film sprocket in unison with each other. A flexible belt is provided for rotating one mirror, and the other mirror is preferably rotated by the first mirror through a flexible coupling having both longitudinal and angular flexibility.

According to a broad statement of one form of the invention, the optical system comprises a concave spherical mirror intercepting the beam during the advance of one frame of the movie film through the gate and means are provided for moving this mirror laterally and moving a similar concave mirror into the beam when another frame of the film comes into the gate and means are provided for controlling the movement of each mirror during the passage of the corresponding film frame across the gate so that its center of curvature moves at one-half the apparent rate of advance of the film as viewed from the mirror position whereby the motion of the film is compensated and a stationary image is formed at unit magnification at one side of the film gate.

It will be further noted that the method of tilting the mirrors whereby the mirrors are made up as a disk divided into two halves is useful whether the mirrors are concave or plane or even convex and on the other hand, I have found that using a concave mirror in an optical system results in surprising superiority of optical performance so long as any sufficiently exact method of tilting the mirrors is used.

According to a special feature of the invention, the effects of film shrinkage are compensated by forming a loop of the film which passes over a floating wheel or drum for measuring the length of the loop and by using the position of the drum or roller to control the pitch of the variable pitch sprocket wheel and to control the total angle of tilt of the mirror.

Some of the features of this invention are common to the related invention described in my copending application Serial No. 308,008, filed September 5, 1952.

In the accompanying drawings:

Fig. 1 is a schematic perspective drawing showing some of the principles of the invention.

Fig. 2 is a graph showing the required movement of a mirror for compensating the motion of the film.

Fig. 5 is a graph showing the required tilting of two mirrors which alternately compensate for the motion of the film.

Fig. 7 is a side view partly in section of the essential parts of a projector according to one form of the invention.

Fig. 8 is a detail showing part of a mechanism for compensating for uneven film shrinkage according to one feature of the invention, and Fig. 9 is similar to Fig. 7 and shows in perspective a projector according to another form of the invention and showing the rest of the film shrinkage compensator partly shown in Fig. 8.

Figure 3:
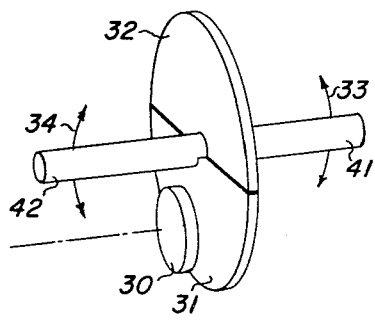
Fig. 3 is a schematic perspective drawing showing a rotating mirror disc according to the invention at the point when one mirror is centered in the beam.

Fig. 1 is a schematic optical diagram showing the optical principles involved in the compensation of the film movement during the exposure of one frame of the film. A lens or lens system 10 is mounted directly in front of a mirror 11 which may be plane as shown or which may be curved itself and thus have dioptic power. The case in which the mirror is plane is the simplest and will be used for explanatory purposes. In this case, the film 12 is mounted in the focal plane 13 of the lens 10 and light rays from the film are collimated by the lens 10 and projected towards infinity. These collimated rays are reflected by the plane mirror 11 and strike the lens 10 again as rays coming from infinity and are focused in the same focal plane 13 forming the image 14. The film 12 is placed to one side of the axis 15 which intersects the plane 13 at point 16. The image 14 of the film is then formed at the other side of the axis and of course is inverted with respect to the film. It will be noted that the axis of the optical system intersects the image plane at a point 16 which is midway between corresponding points of the object and image; for example, the center points of the frame showing the letter D. Now if the film is moved downward as shown by the arrow on the left-hand side of the figure and at the same time the optical system is moved so that the intersection point 16 of its axis with the plane 13 moves downward at one-half the rate of the film movement, then the axis maintains its half-way position between the center point of the frame D of the film and the center point of the frame D (inverted) of the image without any movement of the image taking place. Thus the movement of each individual frame of the film is compensated by the movement of the optical system. In the systems herein described, the movement of the axis of the optical system is effected by a tilting of the mirror 11 as indicated by the arrows 17, 17' through a small angle. For clarity and simplicity, the film gate, illuminating system and the relay lens or projection lens and the mounting of the mirror whereby it is tilted have all been omitted from this diagram.

It will be clear that a more complex lens system will generally be used in practice and it will also be clear that a simple concave mirror with its center of curvature in the plane 13 or any suitable combination of a curved mirror and lens system can be used and the principle of operation is substantially the same. However, it may be pointed out that when a curved mirror is used in combination with a lens system that the plane 13 is not the focal point of the lens system itself but is the self-conjugate unit magnification plane of the whole reflecting system.

Fig. 2 is a graph showing the tilting of the mirror required to compensate the movement of successive frames of the movie film moving downward past a film gate at the standard rate of 24 frames per second. In this graph the time scale runs from left to right and the deflection of the mirror is shown by the vertical ordinate, the horizontal axis 20 indicating zero tilt of the mirror, that is, the mirror, lens system and focal plane 13 are all axially aligned and one frame of the film is exactly even with the image gate 18 shown at the inverted D. The position shown in Fig. 1 corresponds to the center point 24 of the line segment 21 and as the frame D of the film passes downward, the axis point 16 of the optical system also moves downward as shown by the line segment 21. When the frame D is half a frame distance below the image frame 18, that is to say the boundary between frames D and E is opposite the center of the image frame 18, then the mirror should theoretically make an instantaneous return shown by the line segment 22, after which it images the frame E on to the image frame 18 and moves downward as shown by line segment 23 while the image frame E moves downward and repeats the process, each frame being theoretically instantly replaced by the next succeeding frame without any interruption to the illumination. Of course this theoretical performance is not actually possible and even a return time of 1/500 of a second has been found to show some perceptible smearing of the image.

Figure 4:
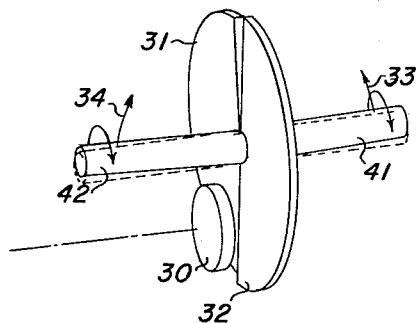
Fig. 4 is a schematic perspective drawing showing the mirrors according to one form of the invention rotated 90° from the Fig. 3 position.

Figs. 3 and 4 are diagrammatic views showing a method of effectively getting an instantaneous return without actually having an instantaneous movement of a mirror by using a disk mirror cut into two halves 31 and 32 and rotating so that the two halves follow each other into and out of the optical beam indicated by the lens ring 30. The mirrors 31 and 32 are mounted on the ends of shafts 41 and 42 respectively, extending behind and in front of the mirror disk respectively. Fig. 3 corresponds to Figs. 1 and 2 in that the half-mirror 31 is in the half-way position corresponding to mirror 11 of Fig. 1 and the point 24 of Fig. 2. The mirror disk 31—32 rotates clockwise and at the same time the far end of shaft 41 is tilted upward as indicated by the arrow 33 giving the mirror 31 a gradually increasing downward tilt represented by line segment 21 of Fig. 2. As the movie frame being projected approaches the bottom edge of the gate, the half-mirror 31 begins to rotate out of the optical beam and the other half-mirror 32 begins to rotate into the optical beam. Fig. 4 shows the half-way point corresponding to line segment 22 of Fig. 2 at which one mirror has its extreme downward tilt for imaging film frame D on the image frame 18 and the other mirror 32 has its extreme upward tilt for imaging the next film frame E on the image gate. Then while this next frame E is going through the film gate, mirror 32 rotates completely into the optical beam and a half a revolution more and at the same time the front end of shaft 42 is given a downward movement, giving the half-mirror 32 the gradually increasing downward tilt indicated by line segment 23 of Fig. 2. Meanwhile, while half-mirror 31 is out of the beam, the far end of shaft 41 is moved downward as indicated by the double-ended arrow 33 (Fig. 3) so that it is given its initial upward tilt by the time it rotates around to the optical beam again.

Fig. 5 is a graph corresponding to Fig. 2 but showing the motions of the two half-mirrors of Fig. 3 and Fig. 4 rather than the motion of the single mirror 11 of Fig. 1. As in Fig. 2, the downward sloping lines represent the downward tilting of a mirror during the exposure of one frame of the film. In this case however, alternate downward sloping lines correspond to the alternate halves 31 and 32 of the mirror disk. That is, the point 54 of the downward sloping line 51 corresponds to Fig. 3 wherein the mirror 31 is at the middle of its range of tilt. The curved dotted lines in Fig. 5 indicate the return of each mirror to its initial tilt angle while it is outside the optical beam. Thus point 54 of Fig. 5 corresponds to Fig. 3 in this additional respect also that mirror 32 is at the mid-point of its return stroke which is represented by the dotted line 52. The vertical dotted line 55 in Fig. 5 corresponds to the position of the mirrors shown in Fig. 4 wherein mirror 31 is almost to the bottom extereme of its downward stroke but will continue downward as indicated by line 51 until it is completely or substantially completely out of the optical beam and at the same instant, mirror 32 has completed its return stroke indicated by the dotted line 52 and substantially at the moment it entered the optical beam it began its downward stroke indicated by the line 53 and has already progressed a perceptible fraction of its downward stroke at the instant shown in Fig. 4 and represented by the vertical dotted line 55. The downward stroke is made at a uniform rate corresponding to the uniform advance of the film through the film gate, but for the optimum smooth action of the mechanism the return stroke is preferably made at uniform acceleration during its first half and uniform deceleration during its last half.

Figure 6:
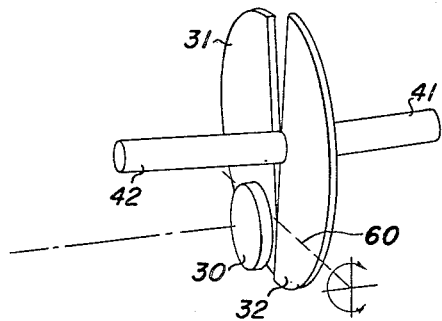
Fig. 6 is a schematic perspective drawing showing the mirrors according to a preferred form of the invention rotated 90° from the Fig. 3 position.

Fig. 6 is a schematic diagram similar to Figs. 3 and 4 showing a preferred method of tilting the mirrors in which the mirrors are not tilted about the horizontal diameter through the mirror disk but rather are tilted about the horizontal chord 60 passing through the center of the optical beam indicated by the lens ring 30. Even though the angle of tilting is greatly exaggerated in Figs. 4 and 6, for the sake of clarity in explaining the principles involved, a noticeable amount of light is lost by the collimated rays which go through the lens system at an angle striking the edge of the mirror 31 in the position shown in Fig. 4 and even passing through the gap between the mirrors. By means of the preferred method of tilting shown in Fig. 6, this gap between the mirrors is greatly reduced as is obvious from a comparison of Fig. 6 with Fig. 4, and consequently the loss of light is greatly reduced. In the embodiment of the invention in which the mirror is curved, the type of tilting shown in Fig. 6 has a further advantage over the tilting shown in Figs. 3 and 4 in that it eliminates out-of-focus effects caused by the movement toward and from the focal plane of the part of the area which reflects the optical beam.

Fig. 7 shows the essential parts of a projector according to the invention partly in side view and partly in section. The particular species shown is that in which the mirror is concave and has a lens system arranged in front of it, but it will be evident that the same mechanism is easily adapted for use with the plane mirror species by changing certain proportions and modifying the gear train as will be described below. The optical system, that is, that part of the whole optical system which forms a unit magnification image, is shown in vertical section, the section being taken in the vertical plane through the axis 15 of Fig. 1. This unit magnification system consists of a lens system and a mirror divided into semi-circular halves 31, 32, which are rotated and tilted as previously described and by a mechanism which will be described presently. In front of the mirror is a system of lenses 71, 72, 73, and 74 for correcting the aberrations of the mirror itself but having very little dioptic power. The optical system as shown is of the form more fully disclosed and claimed in a copending application, Serial No. 358,373, Altman, filed May 29, 1953, now Patent No. 2,742,817.

On the nearer side of the optical axis of the lens system is a diagonal reflector 75, shown as a 45-degree prism, which receives light from any suitable light source such as a lamp and condenser system, the illuminating beam striking the prism substantially perpendicularly to the axis of the unit optical system as indicated by the dot 76 which represents the end-on view of the axis of the condenser system. The light beam is reflected through an area of approximately two frames of the film 12 into the lens 74 and through the rest of the lens system to the mirror 31, and back through the lenses to the image gate 78 which is behind the plane of the entering beam, corresponding to frame 18 of Fig. 1. The apertures of the condenser system and prism are made adequate for illuminating two frames of the film. In the figure the film gate 70 is shown from the axis upward and is cut away to show the lower half of image gate 78 from the axis downward.

An image of the film 12 is focused in the image gate 78 as explained schematically with reference to Fig. 1 and the rays of light proceed through the image gate to the projection lens 79 which projects the image on to a screen. It should be noted that the axis of lens 79 is perpendicular to the image gate 78 at the center of the latter and that accordingly the section plane of lens 79 as shown in this figure is behind the section plane of the other lenses.

Contrary to the usual practice, the film is drawn up through the film gate to allow for the second inversion of the image when the image is relayed by the projection lens. The film is pulled by the sprocket wheel 65 driven by shaft 66 through gearing such as a worm gear as shown. Shaft 66 is driven by some source of motive power, not shown, such as an electric motor, through flexible belt 67 passing over pulley 68 pinned onto the shaft 66. Also pinned onto shaft 66 are a double faced cam 77 and a gear pulley 88 which gives the proper motion to the mirrors and will now be described in connection therewith.

The rotating and tilting of the mirrors follows the general principles shown in Fig. 6, but the arrangement is slightly different in that the median position of the mirror shafts is sloping in order to allow for the concavity of the mirrors and to hold the effective reflecting area of the mirrors substantially normal to the optical beam. One half of the mirror disk 31 is attached to the inner ring of a bearing 81 and the other half of the mirror disk 32 is similarly attached to a bearing 82. The outer ring of each bearing is attached to or forms an integral part of rocker arm 83 or 84 respectively. These rocker arms are bifurcated at the bottom end and pivoted on axis 94, the two legs spreading apart sufficiently to clear the circumference of the mirror disk. This forking may be seen in perspective in a slightly different form of the invention shown in Fig. 9. The upper ends of the arms extend to the neighborhood of the shaft 66 and carry cam followers shown as knurled screws 85, 86, resting against the two faces of the cam 77 and made adjustable to aid in registration of the images of two successive frames of the film. The cam followers are spring-urged against the cam by any suitable means such as the coil spring 87 attached to the rocker arms 83, 84. For rotating the mirrors, two gear pulleys 88, 58 are provided, one on shaft 66 and one on shaft 90 to which the mirror 31 is attached. A rubber gear belt or timing belt 89 is fitted over these pulleys. This gear belt is a commercially available item which is a rubber composition belt with small projections similar to gear teeth on its inner face meshing with the gear teeth on the pulleys. The other half of the mirror disk 32 mounted on shaft 93 is rotated by shaft 90 through a flexible coupling having both longitudinal and angular flexibility, as for example a coupling of the C-flange type shown on pages 15–22 of Kent's Mechanical Engineers' Handbook, Wiley, 1950, since these two shafts rock away from and toward each other on the rocker arms 83, 84.

Fig. 8 is a detailed view of part of an apparatus according to the invention for compensating for uneven shrinkage in film, the rest being shown in Fig. 9. The film 12 forms a loop by running down over one side of a modified sprocket 100, around an idler 101 at the bottom of the loop and back through the film gate 70 and past the other side of the sprocket as indicated by the arrows at the top of the figure. The sprocket wheel includes a rotating disk 102 with sprocket teeth which are slightly smaller than standard and do not fill the sprocket holes in the film in the direction of the length of the film and two polished curved guides 103, 104 of approximately semicircular form over which the film slides. These arcuate guides form parts of the arms 105, 106, which are hinged on a fixed axis 109 in a manner resembling an ordinary nut cracker. The outer ends of levers 105, 106, are crossed over each other and carry cam followers such as rollers 107, 108 which rest against the diagonal faces of a cam 111 attached to arm 110 which carries the idler roller 101. As different sections of film which have suffered a greater or less degree of shrinkage follow each other through the film loop, the loop gets longer and shorter and the idler wheel 101 sinks lower or rises carrying with it arm 110 and cam 111 and allowing the cam followers 107, 108 and hence the lever arms 105, 106, to come together or forcing them apart. The lever arms 105, 106 cross each other and the main parts of the lever arms spread apart and come together respectively when the cam followers come together and spread apart. The effect of this is twofold: first, the film guides 103, 104 at the sprocket are automatically adjusted so that the film rides at the proper height on the sprocket teeth and hence the sprocket wheel pitch is correct for the particular section of film which is being run through, and second, as will be explained with reference to Fig. 9, the angular rate of tilt of the mirror halves is adjusted to conform to the condition (i. e. shrinkage) of the film.

Fig. 9 is a perspective drawing of another form of the invention showing the use of a flat rotating mirror disk and a preferred form of the film loop shrinkage compensator. The film 12 is fed down over the back of the sprocket wheel 100 around the idler 101 carried by the arm 110 and back up through the film gate 70 and over the front of the sprocket wheel 100. The arms 105, 106, the cam followers 107, 108, and the cam are omitted from this drawing for clarity but are or may be as in Fig. 8 for keeping the pitch of the sprocket wheel equal to the pitch of the holes in the film. The shrinkage compensation for the variations in angular speed of advance of the film past the optical system, however, is carried out in a way which will shortly be explained in detail.

The optical system differs somewhat from that of Fig. 7. A light source and condenser 113 and 114 illuminate the film gate 70. Light from the film gate strikes the diagonal mirror 175 corresponding to the prism 75 of Fig. 7 and is reflected into the lens system 10. As previously explained, the film is located at the focal point of the lens system 10 so that collimated light emerges from the lens system and strikes one or both of the halves 31, 32 of the mirror disk whence it is reflected back through the lens system and focused at an image gate, not shown, located behind the film loop in the view of Fig. 11. Light from the image gate is picked up by the projection lens 79 exactly as in Fig. 7 and is projected onto a screen.

The driving power for the film drive and rotation of the mirror disk is preferably applied directly to cam shaft 166 corresponding to shaft 66 of Fig. 7, and this may be done in any suitable way such as by pulley 68 and belt 67 from an electric motor, not shown. The film sprocket wheel 100 is pinned to a gear wheel 118 and these together rotate freely on shaft 116. Gear wheel 118 is driven by gear wheel 117 pinned to cam shaft 166. Shaft 116 is carried by a front main bearing, not shown, and a rear main bearing 120 and is provided with a double crank 121 for detouring around the edge of the mirror disk. Cam shaft 166 is carried on bearings 122 and 123 which are mounted on rocker arms 124, 125, pinned to shaft 116; thus shaft 166 can be rocked forward and backward while the gear wheels 117, 118 remain in mesh for adjusting the relative phase of rotation of the two shafts. The front rocker arm 124 is provided with another branch 126 extending in a general downward direction and making cam contact with a similar arm 127 which is pivoted with an arm 110 carrying the idler roller 101 and is rocked thereby when lengths of film of different shrinkage ratios follow each other through the film loop.

The rocking of the two halves of the mirror disk is carried out in substantially the same way as in Fig. 7 except for the different general shape of the rocker arms 83, 84, to accommodate flat mirrors rather than curved mirrors. The bifurcated ends of the rocker arms rocking on axis 94 are shown more clearly in this perspective drawing than in Fig. 7. The operation of the bearings carrying the halves of the mirror disk and of the universal joint is also substantially the same as in Fig. 7. The operation of the cam 77 by which the rocking of the mirrors is controlled differs from that of Fig. 7 only in the respect that compensation for film shrinkage is incorporated into the operation thereof as will now be explained. When a sample of film which has suffered greater shrinkage is fed through the machine, the roller 101 is raised up by the shorter loop carrying arm 110 and pushing down the opposite arm 127 correspondingly. Arm 127 by its cam action pushes arm 126 opposite arm 124. Arms 124, 125, and 126, are all pinned to shaft 116 and all rotate as a unit as controlled by the pushing of arm 127 and carry shaft 166 with them while maintaining gear wheels 117 and 118 in mesh, as previously mentioned. This movement of shaft 166 to which the double faced cam 77 is pinned carries the axis of the cam closer to the cam followers on the rocker arms 83, 84 and hence, in other words, the cam followers ride on a zone of the cam face which is closer to the axis thereof and at which zone the total rise and fall ow the cam is accordingly smaller than it is farther out near the periphery of the cam. This smaller rise and fall of the cam gives the mirrors 31, 32, a smaller rocking motion as they rotate and the lengths of the various lever arms are determined so as to make this change in the angular rocking of the mirrors exactly compensate the change in the shrinkage condition of the film when one piece of film follows another of different shrinkage characteristic through the projector. The cog belt drive between shafts 166 and the shaft of one of the mirrors is omitted from this drawing for simplicity but is or may be the same as that shown in Fig. 7.

It will be understood that these embodiments of the invention are examples only and that variations therein which will naturally occur to those skilled in the art are considered within the scope of the invention which is as defined by the appended claims. It is also understood that standard parts of standard projection machines have been omitted from the drawings and description where they do not affect the operation of the invention itself.

I have discovered that the best position for the motor axis in Fig. 9 is in the neighborhood of the axis of shaft 116, and for this reason the pulley 68 should be at the right hand end of shaft 166 extended.

I claim:

1. A continuous motion-picture projector comprising a film gate for exposing substantially two frames of a motion-picture film, means of illuminating the film gate, means for passing film through the film gate, an optical system including a mirror disk divided into two independently mounted halves for receiving light from the film gate and for reflecting it back in the same general direction and forming an image of the film gate laterally displaced from the apparent position of the film gate as viewed from the optical system, means for rotating the mirror disk around an axis in the plane of the axis of the optical system one complete revolution for each two frames advance of the film drive, one half of the mirror disk being mounted on a bearing behind the mirrors and the other half on a bearing in front of the mirrors and the optical beam striking the mirrors below the center of the disk, a pair of rocker arms for tilting the halves of the mirror disk, one arm being in front of and one behind the mirror disk and supporting the two bearings, said rocker arms being divided into two legs below the said bearings and said legs straddling the locus of the optical beam and being mounted to rock about an axis which is substantially a chord of the mirror disk through the axis of the optical beam and perpendicular to the plane common to the mirror bearings and the optical axis, a double-faced wedge cam approximately in the plane of the mirror disk and means for rotating the cam precisely in synchronsm with the film drive one-half revolution for each frame of the film advance, the upper ends of said rocker arms being spring-urged against the two faces of the said cam whereby the two halves of the mirror are rocked to and fro in opposite phase during each revolution of the mirror disk, each half of the mirror being tilted at a uniform speed in the apparent direction of travel of the film while intercepting any substantial part of the optical beam and being tilted in the opposite direction to return it to its initial angle of tilt while it is out of the optical beam, whereby the image of each frame of film advancing through the film gate is imaged at a fixed position and the image of each frame is superseded by the image of the succeeding frame.

2. A continuous motion-picture projector comprising a film gate for exposing substantially two frames of a motion-picture film, means of illuminating the film gate, means for passing film through the film gate, an optical system including a mirror disk divided into two independently mounted halves for receiving light from the film gate and for reflecting it back in the same general direction and forming an image of the film gate laterally displaced from the apparent position of the film gate as viewed from the optical system, means for rotating the mirror disk around an axis in the plane of the axis of the optical system one complete revolution for each two frames advance of the film drive, one half of the mirror disk being mounted on a bearing behind the mirrors and the other half on a bearing in front of the mirrors and the optical beam striking the mirrors below the center of the disk, a pair of rocker arms for tilting the halves of the mirror disk, one arm being in front of and one behind the mirror disk and supporting the two bearings, said rocker arms being divided into two legs below the said bearings and said legs straddling the locus of the optical beam and being mounted to rock about an axis which is substantially a chord of the mirror disk through the axis of the optical beam and perpendicular to the plane common to the mirror bearings and the optical axis, face cam means approximately in the plane of the mirror disk and means for rotating the cam means precisely in synchronism with the film drive, the upper ends of said rocker arms being spring-urged against the said cam means at two points such that the two halves of the mirror are rocked to and fro in opposite phase during each revolution of the mirror disk, each half of the mirror being tilted at a uniform speed in the apparent direction of travel of the film while intercepting any substantial part of the optical beam and being tilted in the opposite direction to return it to its initial angle of tilt while it is out of the optical beam, whereby the image of each frame of film advancing through the film gate is imaged at a fixed position and the image of each frame is superseded by the image of the succeeding frame.

(References on following page)

References Cited in the file of this patent

UNITED STATES PATENTS

| | | |
|---|---|---|
| 1,085,392 | Van Riper | Jan. 27, 1914 |
| 1,401,345 | Mechau | Dec. 27, 1921 |
| 1,575,133 | Steigman | Mar. 2, 1926 |
| 1,882,014 | Howell | Oct. 11, 1932 |
| 2,132,003 | Holst | Oct. 4, 1938 |
| 2,532,542 | D'Avitaya | Dec. 5, 1950 |
| 2,601,790 | Magnusson | July 1, 1952 |

FOREIGN PATENTS

| | | |
|---|---|---|
| 8,062 | Great Britain | Sept. 4, 1913 |
| 245,772 | Great Britain | Jan. 6, 1927 |
| 49,219 | Norway | Apr. 7, 1931 |
| 478,912 | Great Britain | Jan. 27, 1938 |
| 988,918 | France | May 16, 1951 |